April 17, 1945.　　　J. SIVERTSEN　　　2,373,788
AUTOMATIC ELECTRONIC LOAD HOLDER
Filed March 26, 1941　　　3 Sheets-Sheet 2
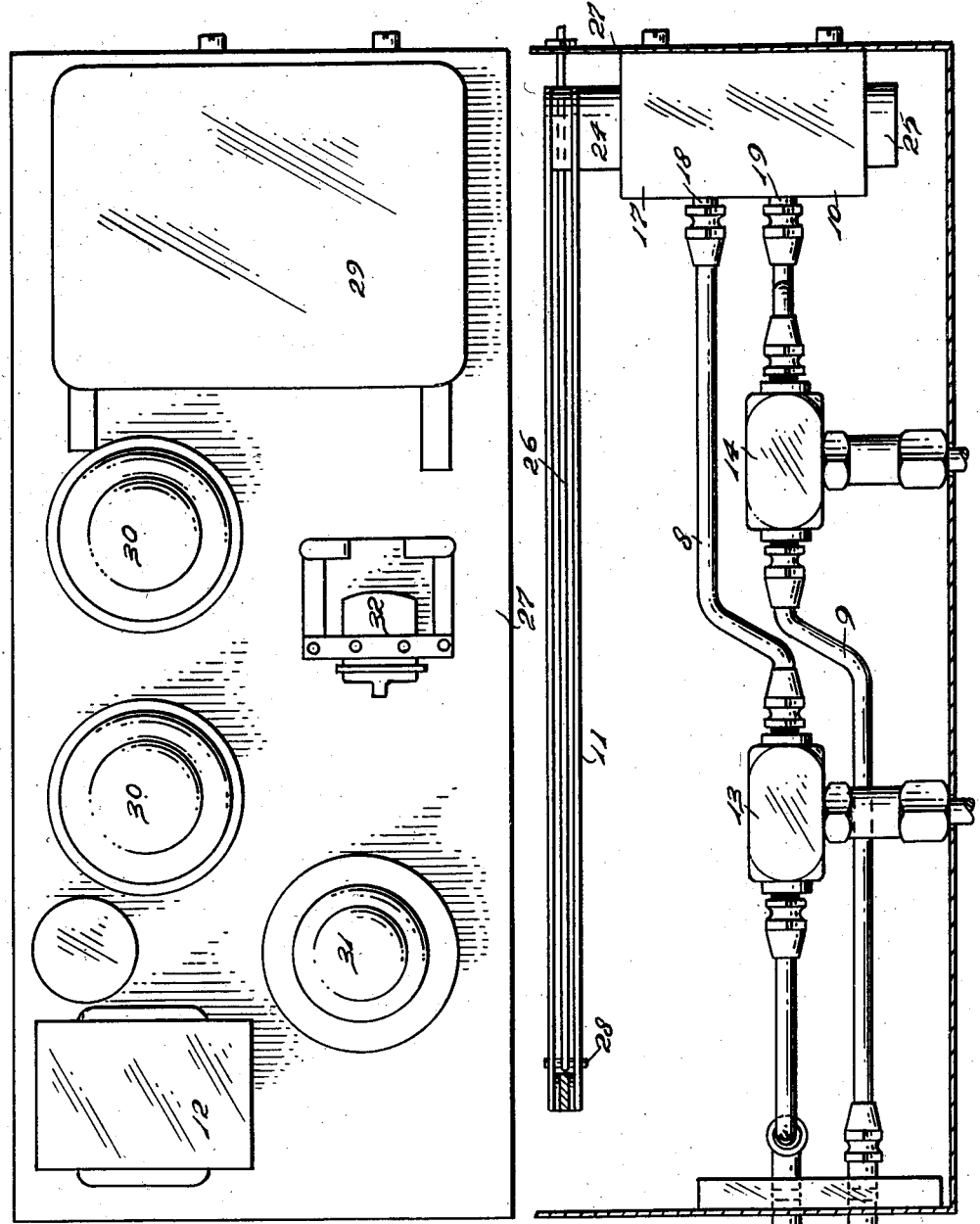
INVENTOR
Jens Sivertsen
BY
Herbert P. Fairbanks
ATTORNEY April 17, 1945.  J. SIVERTSEN  2,373,788
AUTOMATIC ELECTRONIC LOAD HOLDER
Filed March 26, 1941  3 Sheets-Sheet 3
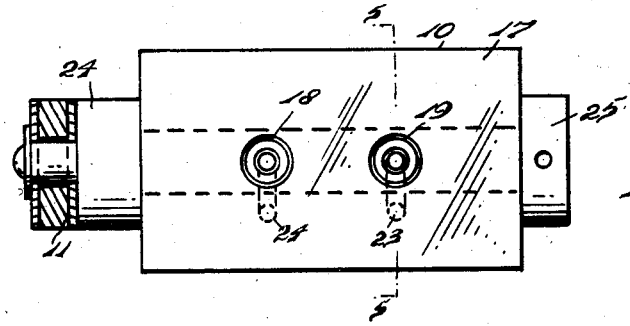
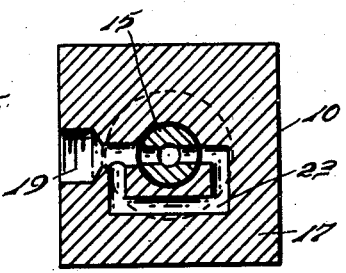
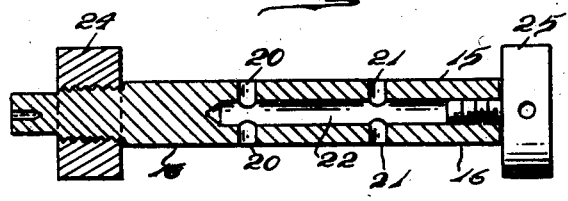
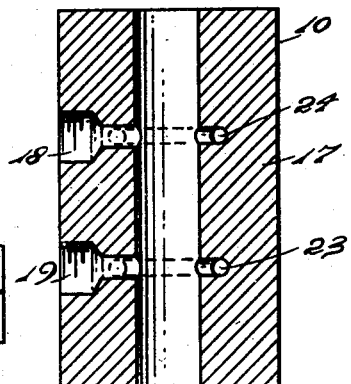
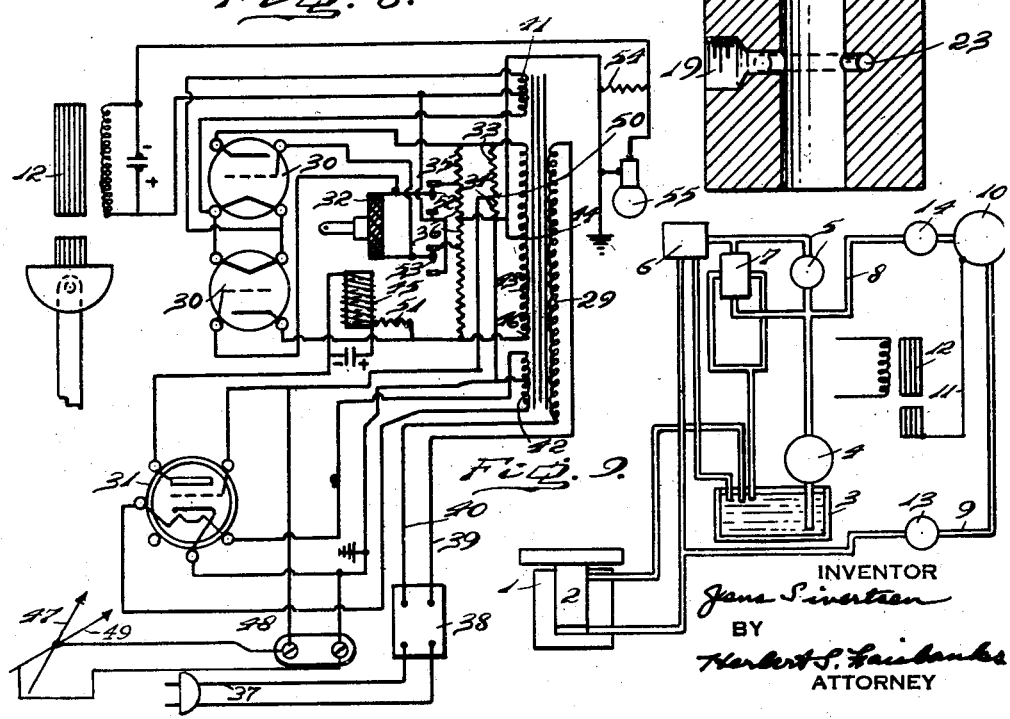
INVENTOR
Jens Sivertsen
BY
Herbert S. Fairbanks
ATTORNEY Patented Apr. 17, 1945

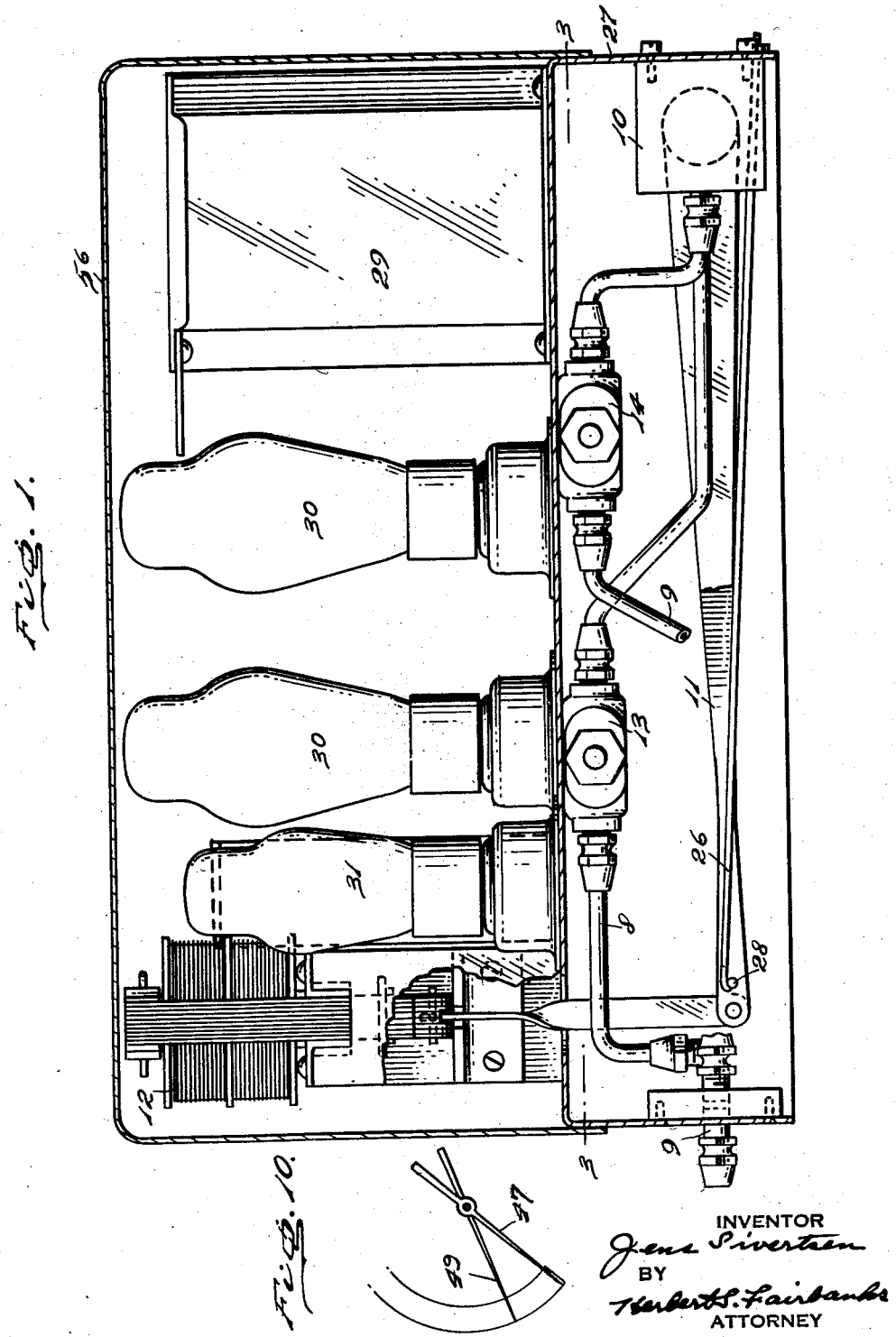

2,373,788

UNITED STATES PATENT OFFICE 2,373,788

AUTOMATIC ELECTRONIC LOAD HOLDER

Jens Sivertsen, Philadelphia, Pa., assignor to Tinius Olsen Testing Machine Company, Philadelphia, Pa., a corporation of Pennsylvania Application March 26, 1941, Serial No. 385,386

3 Claims. (Cl. 250—27)

My invention relates to testing machines for testing the physical properties of materials, and involves a new method and apparatus for electronic control of testing machines or other types of machines.

In the art of testing materials, it is necessary in some cases to maintain a constant load, within close limits, on the specimen for a long period of time, such as hours, days, weeks and even months. Accuracy and reliability are necessary for such tests.

An apparatus of this kind consists primarily of three parts.

A. An instrument to detect deviation from the prescribed load.

B. Means to correct the deviation.

C. Means whereby A, the detecting means, can affect B, the correcting means, to bring about the necessary correction.

The detecting means and control means can be hydraulic or electrical. Different kinds of detectors can be used, such as photocells, capacity, inductance, or contacts together with relays, or vacuum tubes can be used instead of relays.

The present invention relates more particularly to a novel method and apparatus for using a relay with vacuum tubes, thereby enabling one to retain the inherent, favorable characteristics of both the relay and the vacuum tube and to eliminate their weak characteristics. The bad feature of the relay is the burning of the contact points used to switch on and off the power which the relay controls.

In accordance with this invention, contacts are not used to break the flow of current.

With the foregoing and other objects in view as will hereinafter clearly appear, my invention comprehends a novel hydraulic, electronic load holder.

It further comprehends a novel electronic control, which, while particularly designed for the control of testing machines can be employed to control other mechanism.

Other novel features of construction and advantage will hereinafter clearly appear in the detailed description and the appended claims.

For the purpose of illustrating my invention, I have shown in the accompanying drawings a typical embodiment thereof, which in practice will give satisfactory and reliable results. It is, however, to be understood that the various instrumentalities of which my invention consists can be variously arranged and organized, and that my invention is not limited to the exact arrangement and organization of these instrumentalities as herein set forth.

Figure 1 is a side elevation, partly in section, of an electronic load holder embodying my invention.

Figure 2 is a top plan view of Figure 1.

Figure 3 is a sectional plan view, the section being taken on line 3—3 of Figure 1.

Figure 4 is a side elevation of a control valve employed.

Figure 5 is a sectional view of the valve plug, on line 5—5 of Figure 4.

Figure 6 is a sectional view of the valve plug.

Figure 7 is a sectional view of the valve casing.

Figure 8 is a wiring diagram.

Figure 9 is a diagrammatic view of a testing machine and connections to the control valve of the electronic control.

Figure 10 is a detail showing the hands of the dial indicator.

Similar numerals of reference indicate corresponding parts.

Referring to the drawings:

As shown in Figure 9, 1 designates the cylinder of an hydraulic testing machine and 2 the piston. 3 is an oil reservoir. 4 is a pump and 5 the operating valve. 6 is a release valve. 7 is an automatic pressure valve which holds a constant, hydraulic potential difference between the pressure side of the pump and the cylinder of the testing machine.

The load holder is connected to this substantially standard arrangement by pipes 8 and 9, which communicate with a novel control valve 10. The control valve 10 has one end of a lever 11 connected with it, the other end of said lever being connected to a movable part of a solenoid 12 to cause the valve 10 to turn when the solenoid is energized. 13 and 14 are manually actuated adjusting valves for the load holding apparatus.

The valve 10, see more particularly Figures 4, 5, 6 and 7, is balanced, and, due to the slight movement of its valve plug 15, a long lever arm can be used. The valve plug 15 is accurately guided by its valve stem 16, and, due to its simple construction, a nearly perfect polish can be given to the valve plug and the bore of the valve casing 17. This results in very little friction and very little wear, so that the valve mechanism will stand up for a very long time without undesired leakage, and, therefore, will be reliable in operation. The small clearance between the valve plug and the valve casing provides for the presence of an oil film, which further reduces friction. The total result of such valve arrangement is a sensitive valve that moves easily, considering the pressures involved, and one which has a minimum of wear.

The valve casing 17 has an inlet 18 and an outlet 19 which are threaded to receive the pipes 8 and 9, respectively. The valve plug has ports 20 and 21 which communicate with the passage 22. A passage 23 leads to opposite sides of the valve plug to balance the pressures, and, in a similar manner, a passage 24 leads from the port 18 to opposite sides of the valve plug to balance the pressures on the plug. The valve plug is retained in assembled relation with its valve casing by the nuts 24 and 25.

The movable part of the solenoid, see Figures 1 and 3, is retained in its lowered position by a spring rod 26, fixed at one end to the casing 27, and having its free end bearing against a pin 28 fixed to the lever 11.

Referring now more particularly to the wiring diagram seen in Figure 8, I have shown an electronic control, employing a power transformer 29, the solenoid 12, power tubes 30, a control tube 31, a relay 32 and resistors 33, 34, 35 and 36. The other resistors and condensers are arranged and used in a conventional manner.

The relay 32 is a standard D. C. relay of the double pole, double throw type, with a large number of turns on the coil for a small current and a high voltage.

The resistor 33 is of very high order, fifty to one hundred million ohms. For certain arrangements where short leads can be used in the control circuit, it can be greater than that above stated, and when high sensitivity is not required it can be lower.

The resistor 34 can be two million ohms, more or less, depending on the characteristics of the tube 31, the size of resistor 33, and the voltage of transformer 29.

The tubes 30 should be power tubes, and, as illustrated, they are class A tubes. Class A tubes are tubes which will pass a large amount of current when their grids are at the same potential as the cathodes (or filaments).

The cable 37 is adapted to be connected with a source of supply of 110 volt, 60 cycle current and with a switch 38, which is connected by lines 39 and 40 with the primary windings of the transformer 29 to complete the primary circuit of the transformer.

41 is a heater winding to heat the filaments of the power tubes 30. The heater winding 42 heats the filament of the tube 31. The third secondary winding 43 of the transformer 29 is center tapped at 44. This winding 43, is a high voltage winding, approximately one thousand volts, and supplies power through the tubes 30 to operate the solenoid 12 and the valve 10, as herein described. This winding 43 also supplies power to operate the coil 45 of the relay 32, by tube 31. The transformer also supplies the control current for the pointers of the indicator, by means of resistors 33 and 34, and the current for the resistors 35 and 36. Assuming now that the primary circuit for the transformer is completed, and the heater filaments of the tubes are heated by their windings, the resistors 33 and 34 will bias the grid of the tube 31, so that this tube will substantially not pass any plate current, even though the plate is supplied with plate voltage from 46 of the high voltage winding of the transformer. When the lower limit pointer 47, wired to point 48, touches the indicating pointer 49, the resistor 34 is shorted to ground. The point 50 will then be at zero potential, while it previously had a potential opposite to that of point 46. The tube 31 will now pass plate current from point 46 to resistor 51, relay coil, plate of tube 31 and from plate to cathode of tube 31 and to ground, which is the same as the center point of the secondary winding. This operates relay 32, and the movable contacts 52 and 53 will change their position from the upper to the lower contacts of the relay. Previous to this, the tubes 30 did not pass current, although they had plate voltage, due to the fact that they were biased by resistors 35 and 36 to have a grid bias opposite to that of the plate voltage.

The operation of the relay connects the grids with the filaments of the tubes 30, from winding 41, and the grids will have substantially the same A. C. potential as the cathodes of the tubes 30. This allows the tubes 30 to pass current, and they will act as a full rectifier supplying D. C. current to the solenoid.

Since each tube 30 acts alike, we will refer only to the lower tube 30.

When the point 46 is positive, we obtain a current through the plate, the filament of the tube, winding 41, solenoid 12, resistor 54, and pilot light 55 to ground, which is the center tap 44 of the secondary winding. The pilot light, when lighted, indicates that the circuit is in operation.

The energization of the solenoid draws upwardly the lever 11, loading spring 26 and turns valve plug 15 into position for the ports 20 and 21 to register with 18 and 19 respectively. This causes oil to pass from the pump 4, by pipe 8, valve 14, valve 10, pipe 9, and valve 13 into the cylinder 1 of the testing machine. This will cause the load indicating pointer to rise and break the contact between the two pointers. The tube 31 will cease to pass current, the relay coil will be de-energized, the movable contacts of the relay will change their position, and the tubes 30 will cease to pass current. The spring 26 now brings the valve plug into a position to cause ports 20 and 21 to be out of registry with 18 and 19 respectively. When the indicator pointer falls off, due to leakage in the cylinder 1 or for any other reason, and again touches the lower limit pointer, the cycle is repeated.

When the solenoid is energized the pilot light is lit, and when the solenoid is de-energized, the pilot light is extinguished.

A cover 56 is provided to protect the electronic control.

The load indicating pointer 49 of the testing machine is grounded to the frame by a metallic connection, and the lower limit pointer 47 is insulated from the frame of the machine. The arrangement is such that when the load on the specimen diminishes to the lower limit, contact is made between the two pointers, which acts as a shorting of the resistor 34 to ground. A. C. current will pass through the contacts, but the amount will be very small and not sufficient to injure the contacts, even after a long usage, due to the fact that this current is connected in series with a resistor 33 of very high magnitude. The voltage trying to establish the contact if the ground is not perfect is quite high, and results in a very satisfactory arrangement, which will be clearly understood from the following:

Let us assume that half of the secondary of the transformer 29 is 520 volts i. e. between ground (the center of the secondary windings) and the end where resistor 31 is connected, and that resistor 33 is 50 megohms and resistor 34 is two megohms.

Before contact is made between the load indicating pointer 47 and the lower limit pointer 49, there will be approximately 10 volts across the contacts, which is considerable voltage to ensure contact. The current, however, when contact is established, is very small, approximately 10 microamps. When the contact again breaks, there will not be any sticking or arcing due to the small amount represented by this voltage and current, which is approximately 1 tenth milliwatt or $10^{-4}$ watts.

If for any arrangement this current is too large, it can be made to work for less than this value by selecting other values of resistors and voltages, and also of tubes, and taking the necessary precaution as to capacity effect and insulation resistance. The values given are sufficiently sensitive for the purpose of the present application.

The tube 31 is generally a high mu tube.

Before contact is established, one sees that the grid voltage and the plate voltage of tube 31 are exactly 180 degrees out of phase. This will block current passing from plate to cathode of the tube, thereby, also through the coil of the relay.

As soon as the contact arrangement shortens resistor 34, the tube 31 passes current in the plate-cathode path and the D. C. relay 32 becomes energized. This throws the contacts of the relay over for the grid connections of the tubes 30. These tubes are arranged in a similar way, with the plate and the grid voltage 180 degrees out of phase, and are thereby prevented from passing current. When the relay is energized, the grid voltage disappears, as the grids are brought to the same potential as the cathode. The current in the plate circuit will rise and energize the solenoid 12, and this will cause the valve 10 to open and apply load to the specimen in the testing machine. The pointers will break the contact and the valve 10 closes.

If we assume that the current in the solenoid is 250 milliamps and the remaining voltage, plate to cathode, is approximately 100 volts, i. e. 400 volts across the load (solenoid 12), we obtain a delivered wattage in the solenoid of .25 times 400 equals 100 watts.

The amount to be dissipated in the two tubes, however, will be only 15 watts per tube, which is reasonable.

The control ratio will be:

$$\frac{100 \text{ watts in the solenoid}}{10^{-4} \text{ watts for controlling}} = 1{,}000{,}000 \text{ to } 1$$

We are able to control an energy a million times greater than the input, with very simple means.

One feature is that the arrangement does not have any contacts to break or contacts to burn in the relay, and the arrangement will work indefinitely in service.

The tubes, as today manufactured, are very reliable and as a rule lose power gradually. They can be readily replaced due to their low cost after having served for a specified number of hours, irrespective of their condition.

Having thus described my invention, what I claim as new and desire to secure by Letters Patent is:

1. An electronic control system to maintain a predetermined, constant load on a testing machine, comprising a power transformer with an alternating current supply to its primary, and with a high voltage secondary, resistors across said high voltage secondary, two power tubes supplied with an alternating current voltage through said resistors from said high voltage secondary, a control tube and a relay, said relay controlled by the control tube having two sets of fixed and movable contacts, with the movable contacts connected to the grids of said power tubes, the fixed contacts being connected to said resistors to cause the plate voltages and the grid voltages of said power tubes to counteract each other when the relay is not energized, the energization of said relay causing the grid voltage to become substantially the same as the cathode voltage of said power tubes to cause said power tubes to pass a substantial amount of current for the desired control.

2. A control system comprising a transformer; an impedance shunted across the secondary of the transformer, a power tube having a plate, a grid and a cathode, a relay having a movable contact and two stationary contacts, a primary control tube to energize said relay, said movable contact being connected to the grid of the power tube, the plate of the power tube being connected to one of the terminals of the secondary, the cathode of the power tube being connected to a tap on said secondary, one of the stationary contacts being connected to said impedance, the other stationary contact being connected with the cathode of said power tube to cause current to be passed by the power tube upon the energization of said relay by said control tube.

3. A control system, comprising a transformer, an impedance shunted across the secondary of the transformer, two power tubes, each having plate, grid and cathode, a relay having two sets of movable and stationary contacts, a primary control tube to energize said relay, the movable contacts being connected to the grids of the power tubes, the plates of the power tubes being connected to opposite terminals of the secondary, the cathodes of the power tubes being connected together and over a load impedance to the center of the secondary, one of the stationary contacts of each set being connected to opposite points on the impedance, the other two stationary contacts being connected together and to the cathodes to cause current to be passed by the power tubes on energization of said relay by said control tube.

JENS SIVERTSEN.